United States Patent [19]

Venezio

[11] 4,043,228

[45] Aug. 23, 1977

[54] SOCKET WRENCH

[76] Inventor: William R. Venezio, 3078 McDonald Ave., Schenectady, N.Y. 12304

[21] Appl. No.: 746,960

[22] Filed: Dec. 2, 1976

[51] Int. Cl.² .................................. B25B 17/00
[52] U.S. Cl. ........................................ 81/57.3
[58] Field of Search ............... 81/57.3, 57.31; 74/329, 74/330

[56] References Cited

U.S. PATENT DOCUMENTS

| 1,042,736 | 10/1912 | Wildmo | 81/57.3 |
| 1,327,991 | 1/1920 | Gatewood | 81/57.3 |
| 1,346,505 | 7/1920 | Mitchell | 81/57.3 |
| 1,423,142 | 7/1922 | Owens | 81/57.3 |
| 1,705,032 | 3/1929 | Short | 74/330 |

Primary Examiner—James L. Jones, Jr.
Attorney, Agent, or Firm—Oltman and Flynn

[57] ABSTRACT

A manual socket wrench having an adjustble gear reduction between the handle and the socket. The gear ratio may be adjusted by shifting axially a gear-carrying intermediate shaft and locking that shaft in the axial position to which it has been adjusted.

4 Claims, 3 Drawing Figures

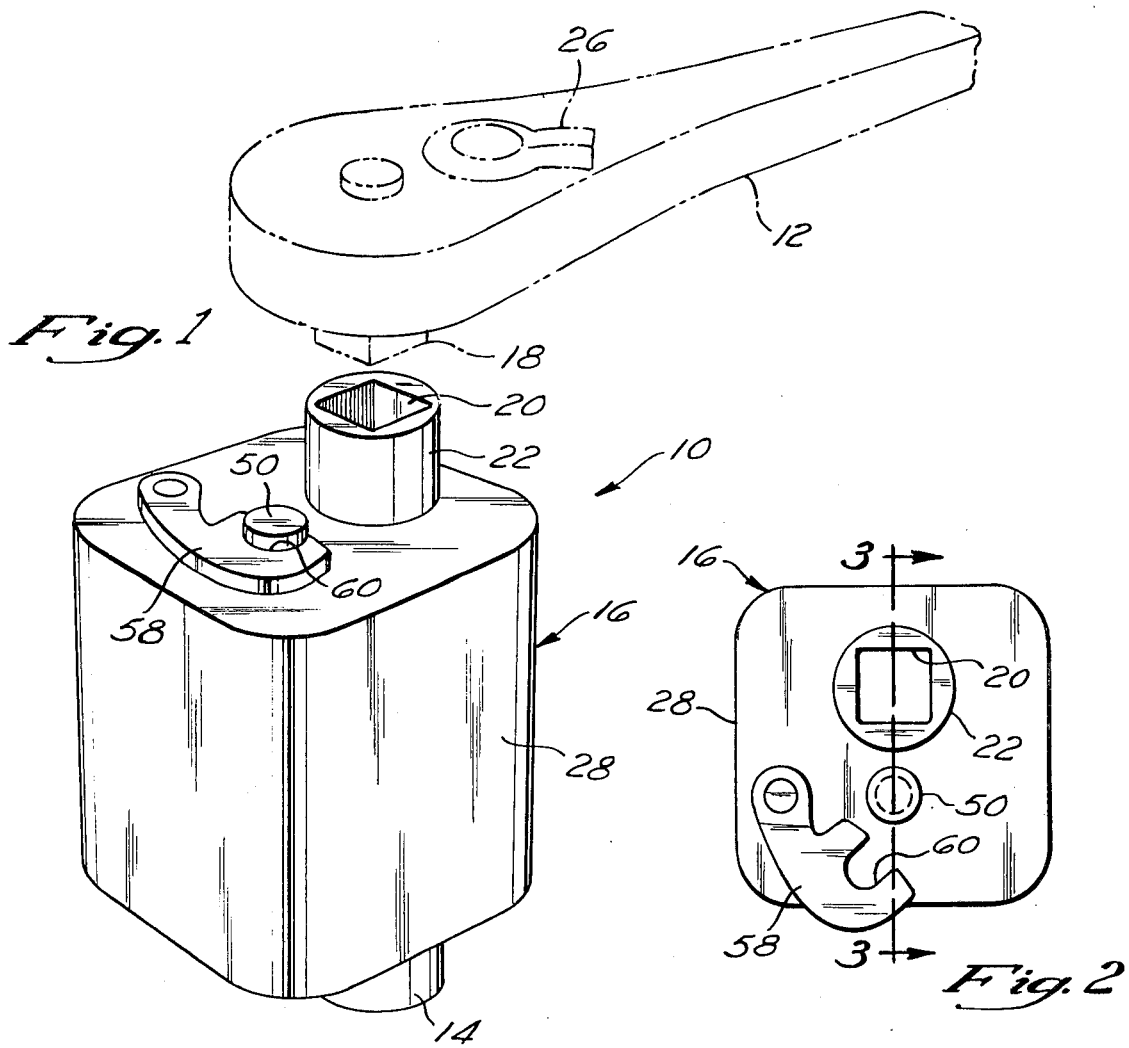
*Fig. 1*
*Fig. 2*
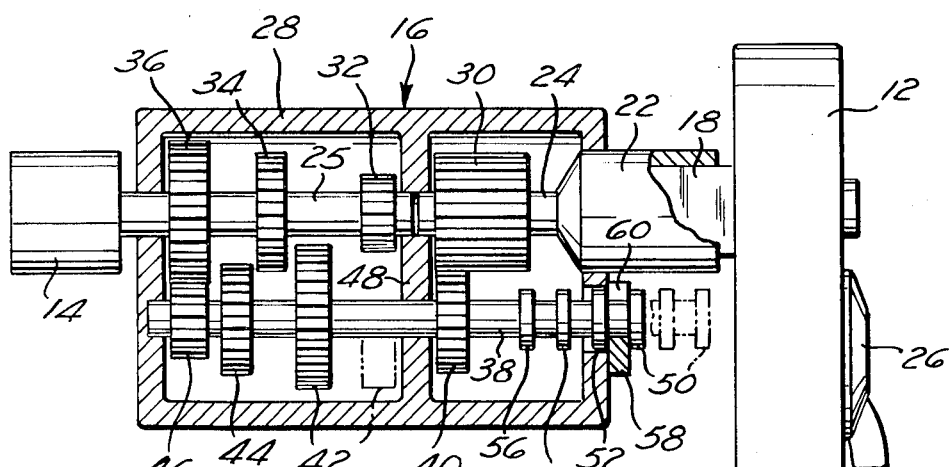
*Fig. 3*

SOCKET WRENCH

BACKGROUND OF THE INVENTION

Various manually operated socket wrenches have been proposed heretofore in which the socket is driven from a rotatable handle through gears acting between them. For example, such wrenches are disclosed in the following U.S. pat. Nos.:

Wildmo 1,042,736; Gatewood 1,327,991; Mitchell 1,346,505; Owens 1,432,142; Kientz 1,648,134; and Moritz, et al 2,478,935.

SUMMARY OF THE INVENTION

The present invention is directed to a novel and improved manually operated socket wrench having a selectively adjustable gear ratio in the gear reduction between the handle and the socket.

In the presently-preferred embodiment, the gear reduction has an intermediate shaft which is axially adjustable manually to change the gear ratio and a pivoted locking lever for locking this shaft axially in any one of several different axial positions. Different diameter gears on this intermediate shaft are engageable individually with corresponding gears on the socket shaft, depending upon the axial position of the intermediate shaft, so as to change the gear ratio in the gear reduction drive from the handle to the socket.

A principal object of this invention is to provide a novel and improved manually operated socket wrench having a selectively variable gear reduction acting between the handle and the socket.

Further objects of this invention will be apparent from the following detailed description of a presently-preferred embodiment, which is shown in the accompanying drawing in which:

FIG. 1 is a perspective view of a manual socket wrench in accordance with a preferred embodiment of the invention;

FIG. 2 is a planned view of the socket wrench of FIG. 1;

FIG. 3 is a longitudinal sectional view of the socket wrench.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

The socket wrench 10 includes a handle 12, a socket 14, and a gear reduction 16 acting between the handle and the socket. The handle 12 in this embodiment is a conventional ratchet type handle for a socket wrench. It has a stud 18 which, in the use of a normal socket wrench, is inserted into a recess in a socket. However, in this embodiment, the stud 18 is inserted into a recess 20 in a member 22 affixed to the input shaft 24 of the gear reduction 16. The handle 12 includes a ratchet device (not shown) which is set by means of a lever 26 in a known manner.

The gear reduction 16 includes an input shaft 24 and an output shaft 25 mounted in a casing 28 for rotation. The input shaft 24 carries drive gear 30. The output shaft 25 carries driven gears 32, 34 and 36 of different diameters. The gear reduction 16 also includes an axially movable intermediate shaft 38 mounted on the casing 28 for rotation. The intermediate shaft 38 carries a corresponding plurality of intermediate gears 42, 44 and 46 of different diameters which can be engaged to a corresponding driven gear on the output shaft 25 in different axial positions of the shaft 38. Another intermediate gear 40 on shaft 38 remains engaged with drive gear 30 in all axial positions of shaft 38.

The shaft 38 is slidably received in an opening in a partition 48 of the casing 28, so that the shaft 38 can be axially shifted back and forth within the casing. The shaft 38 carries collars 50, 52, 54 and 56 for retaining the intermediate shaft 38 in different axial positions while permitting the shaft to rotate in each of the different axial positions. The collars can move through an opening in the casing 28. The intermediate shaft 38 is locked in a given axial position by engaging it with a locking lever 58 which has a recess 60 for snapping onto the shaft 38. The lever 58 may be made of yieldable plastic so that the recess 60 will have a snap fit on the shaft 38. The lever 58 is engaged between any two adjoining pairs of the collars 50, 52, 54 and 56 for locking the intermediate shaft in a given axial position. The inner ends of shafts 24 and 25 are also rotatably mounted in an opening in partition 48.

In the position of the shaft 38 shown in FIG. 3, gear 46 engages gear 36, and gear 40 engages gear 30. Thus, when the handle 12 is turned, the socket 14 will be driven with a predetermined gear reduction. When the shaft 38 is moved one step to the right as viewed in FIG. 3, gear 44 will engage gear 34, and gear 40 will still engage gear 30. Thus, by turning the handle 12, the socket 14 will be rotated with still a different gear reduction. It may be noted that the input gear 30 is wide enough to remain in engagement with the intermediate gear 40 in all three axial positions of gear 40. It may also be noted that a different number of gears and axial positions of the intermediate shaft 38 may be provided if desired.

Thus, the device 10 has different gear ratios in the gear reduction 16 for selecting the mechanical advantage between the handle 12 and the socket 14 as desired.

I claim:

1. In a socket wrench having a handle to be turned, a rotatable socket, a gear reduction acting between said handle and said socket, and means for selecting one of two or more different gear ratios in said gear reduction to select accordingly the mechanical advantage between said handle and said socket, the improvement wherein said gear reduction and said selecting means comprise:

an output shaft carrying said socket and carrying a plurality of driven gears of different diameters;

an axially adjustable intermediate shaft carrying a corresponding plurality of gears of different diameters which are drivingly engageable individually with corresponding driven gears on the output shaft in different axial positions of said intermediate shaft;

and means for selectively locking said intermediate shaft in said different axial positions while permitting rotation of said intermediate shaft in each of said different axial positons.

2. A socket wrench according to claim 1 and further comprising a casing enclosing said driven gears and said gears on the intermediate shaft, and wherein said locking means is adjustably mounted on the outside of said casing between a position in which it engages said intermediate shaft to lock the latter against axial movement and a retracted position in which it is disengaged from said intermediate shaft to permit the latter to be shifted axially.

3. A socket wrench according to claim 2, and further comprising:
   a rotatable drive shaft operatively coupled to said handle to be turned by the latter and carrying a drive gear inside said casing;
   and an additional gear on said intermediate shaft inside said casing which engages said drive gear in all of said different axial positions in which the intermediate shaft may be locked by said locking means.

4. A socket wrench according to claim 3, wherein said handle and said locking means are located outside said casing at one end of the latter, and said socket is located outside said casing at the opposite end thereof.

* * * * *